United States Patent Office 2,742,486
Patented Apr. 17, 1956

2,742,486

PROCESS FOR THE PRODUCTION OF 17β-ACYL-OXYANDROSTANE-3,6-DIONE

Samuel H. Eppstein, Galesburg, and Hazel Marian Leigh, Kalamazoo, Mich., assignors to The Upjohn Company, Kalamazoo, Mich., a corporation of Michigan No Drawing. Application July 16, 1953,
Serial No. 368,492

6 Claims. (Cl. 260—397.4)

The present invention relates to steroid compounds, and is more particularly concerned with a novel one-step process for the production of 17β-acyloxyandrostane-3,6-diones from 6β-hydroxytestosterone by selective acylation of the 17β-hydroxy group with concomitant rearrangement of the Δ⁴-6β-hydroxy grouping to a 6-keto group, a process which may be represented by the formulae:

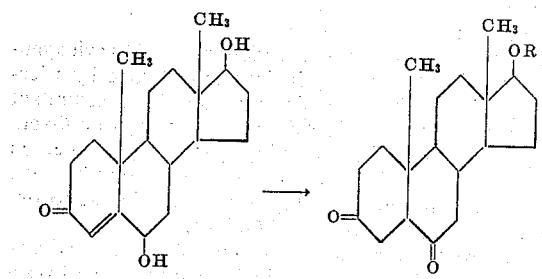

wherein R is the acyl radical of an organic carboxylic acid.

It is an object of the present invention to provide a simple and convenient one-step process for the production of a 17β-acyloxyandrostane-3,6-dione from 6β-hydroxytestosterone by selective acylation of the 17β-hydroxy group with concomitant rearrangement of the Δ⁴-6β-hydroxy grouping to a 6-keto group. The 17β-acyloxyandrostane-3,6-diones produced by the process of this invention are physiologically active, having desirable protein anabolic activity and adrenocorticotropic hormonal functions, and also are convertible to other interesting compounds, e. g., 17β-acetoxyandrostane-3,6-dione on hydrolysis of the 17β-acetoxy group to a 17β-hydroxy group with acid or base, followed by oxidation of the 17β-hydroxy group to a 17-keto group with chromic acid, provides androstane-3,6,17-trione [Balant and Ehrenstein, J. Org. Chem., 17, 1587 (1952)]. Other objects and uses of the present invention will be apparent to one skilled in the art to which this invention pertains.

According to the novel process of the present invention for the production of a 17β-acyloxyandrostane-3,6-dione from 6β-hydroxytestosterone by selective acylation of the 17β-hydroxy group with concomitant rearrangement of the Δ⁴-6β-hydroxy grouping to a 6-keto, 6β-hydroxytestosterone is reacted with an organic carboxylic acid at a temperature between fifteen and about eighty degrees centigrade to obtain a 17β-acyloxyandrostane-3,6-dione.

In carrying out the simple process of the present invention, 6β-hydroxytestosterone (prepared by bio-oxidation of testosterone as shown in Preparation 1) is reacted with an organic carboxylic acid such as, for example, acetic, propionic, butyric, isobutyric, valeric, hexanoic, heptanoic, octanoic, β-cyclopentylpropionic, lactic, thioglycolic, acrylic, vinylacetic, phenylacetic, trimethylacetic, dichloroacetic, ethoxyacetic, benzoic, hexahydrobenzoic, hydroxy-acetic, trichloroacetic, or other organic carboxylic acid. If the organic carboxylic acid is a liquid at the temperature of the reaction, it is preferred to use an excess of the chosen organic carboxylic acid as a solvent, such organic carboxylic acids being preferred reactants. However, if the organic carboxylic acid is a solid at the reaction temperature employed an inert organic solvent is used.

It has been found that the addition of a strongly acidic catalyst (pKa<2), e. g., hydrogen chloride, sulfuric acid, or other mineral acid, para-toluenesulfonic acid, or other benzenesulfonic acid, or other strongly acidic catalyst, facilitates the reaction when a weakly acidic, organic carboxylic acid (pKa>2), e. g., acetic, propionic, benzoic, or most other organic carboxylic acids is used. It is usually preferred, therefore, to add a strongly acidic catalyst to the reaction mixture, usually as a solution in the chosen organic carboxylic acid. However, when the organic carboxylic acid used is strongly acidic (pKa<2), e. g., trichloroacetic acid, the effect of adding a strongly acidic catalyst is negligible. The amount of strongly acidic catalyst is not critical, and amounts up to one gram, or more, per gram of starting steroid are satisfactory.

The reaction usually is conducted under essentially anhydrous conditions, the presence of significant amounts of water causing decreased yields. Therefore, it is sometimes preferred to add a neutral drying agent to the reaction mixture, especially if the reagents used contain water, e. g., when para-toluenesulfonic acid is used, it customarily is added as the monohydrate. Suitable neutral drying agents are, for example, anhydrous sodium sulfate, anhydrous calcium sulfate, etc.

The reaction can be conducted at a temperature from fifteen to about eighty degrees centigrade, with room temperature (from about twenty to about thirty degrees centigrade) being entirely satisfactory in most instances. Usually the reaction mixture is allowed to stand at room temperature for a reaction period of between about six and about 48 hours. However a shorter reaction period can be used at higher temperatures. At the end of the reaction period the 17β-acyloxyandrostane-3,6-dione product can be separated from the reaction mixture by conventional procedure, e. g., the isolation procedure of Example 1.

The following examples are illustrative of the process of the present invention, but are not to be construed as limiting.

PREPARATION 1.—6β-HYDROXYTESTOSTERONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. To 120 liters of this sterilized medium there was added an inoculum of *Rhizopus reflexus*, American Type Culture Collection Number 1225, and the medium was incubated for 24 hours at a temperature of 28 degrees centigrade using a rate of aeration and stirring such that the oxygen uptake was 6.3 to 7 millimoles per hour per liter of Na₂SO₃ according to the method of Cooper, Fernstrom and Miller, Ind. Eng. Chem., 36, 504 (1944). To this medium, containing a 24-hour growth of *Rhizopus reflexus*, was added sixty grams of testosterone, dissolved in one liter of absolute ethanol, to provide a suspension of steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts, including solvent, were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The residue was dissolved in hot ethyl acetate and cooled to room temperature to produce crystals. The crystals were recrystallized from ethyl acetate to give four grams of crystals having a softening point of 205 degrees centigrade and a melting point of 214 to 216 degrees centigrade. Recrystallization twice more resulted in crystals of 6β-hydroxytestosterone having a melting point of 216 to 220 degrees centigrade.

*Analysis.*—Percent calculated for $C_{19}H_{28}O_3$: C, 74.96; H, 9.27. Found: C, 75.35; H, 9.32.

Example 1.—17β-acetoxyandrostane-3,6-dione

Ten milligrams of 6β-hydroxytestosterone was dissolved in one milliliter of acetic acid and thereto was added two drops of an acetic acid solution containing ten percent sulfuric acid. After allowing the reaction mixture to stand for 24 hours at room temperature, the mixture was made alkaline with an excess of aqueous sodium carbonate solution, saturated with sodium chloride and extracted three times with ten-milliliter portions of ethyl acetate. The combined ethyl acetate extracts were washed with water, dried over anhydrous sodium sulfate and evaporated at room temperature. The residue was recrystallized from 0.3 milliliter of acetone by the dropwise addition of hexane to yield five milligrams of 17β-acetoxyandrostane-3,6-dione of melting point 185 to 186 degrees centigrade. Infrared analysis confirmed the structure of the product as 17β-acetoxyandrostane-3,6-dione.

Example 2.—17β-propionyloxyandrostane-3,6-dione

Following the procedure shown in Example 1, reaction of 6β-hydroxytestosterone with propionic acid, using sulfuric acid as the catalyst, gives 17β-propionyloxyandrostane-3,6-dione.

Example 3.—17β-(β-cyclopentyl)-propionyloxyandrostane-3,6-dione

In the same manner as shown in Example 1, reaction of 6β-hydroxytestosterone with β-cyclopentylpropionic acid, using a solution of sulfuric acid in β-cyclopentylpropionic acid as the catalyst, gives 17β-(β-cyclopentyl)-propionyloxyandrostane-3,6-dione.

Example 4.—17β-butyryloxyandrostane-3,6-dione

In the same manner as shown in Example 1, by treatment of a solution of 6β-hydroxytestosterone in butyric acid with a solution of sulfuric acid in butyric acid, 17β-butyryloxyandrostane-3,6-dione is obtained.

Example 5.—17β-acetoxyandrostane-3,6-dione

Following the procedure of Example 1, treatment of 6β-hydroxytestosterone with acetic acid and a solution of hydrogen chloride dissolved in acetic acid provides 17β-acetoxyandrostane-3,6-dione.

Example 6.—17β-acetoxyandrostane-3,6-dione

In the same manner as in Example 1, by treatment of a solution of 6β-hydroxytestosterone in acetic acid with a solution of para-toluenesulfonic acid monohydrate dissolved in acetic acid in the presence of anhydrous sodium sulfate 17β-acetoxyandrostane-3,6-dione was obtained.

Example 7.—17β-acetoxyandrostane-3,6-dione

Following the procedure of Example 1, by treatment of 6β-hydroxytestosterone with acetic acid and a solution of chlorobenzenesulfonic acid dissolved in acetic acid 17β-acetoxyandrostane-3,6-dione was obtained.

In the same manner as shown in Examples 1 through 7 other esters of 17β-hydroxyandrostane-3,6-dione are obtained by reacting 6β-hydroxytestosterone with the appropriate organic carboxylic acid, including: 17β-isobutyryloxyandrostane-3,6-dione; 17β-valeryloxyandrostane-3,6-dione; 17β-isovaleryloxyandrostane-3,6-dione; 17β-hexoxyandrostane-3,6-dione; 17β-trimethylacetoxyandrostane-3,6-dione; 17β-dichloroacetoxyandrostane-3,6-dione; 17β-phenylacetoxyandrostane-3,6-dione; 17β-lactyloxyandrostane-3,6-dione; 17β-thioglycolyloxyandrostane-3,6-dione; 17β-acrylyloxyandrostane-3,6-dione; 17β-vinylacetoxyandrostane-3,6-dione; 17β-trimethylacetoxyandrostane-3,6-dione; 17β-dichloroacetoxyandrostane-3,6-dione; 17β-hexahydrobenzoyloxyandrostane-3,6-dione, and similar like compounds.

It is to be understood that this invention is not to be limited to the exact details and compounds shown and described as obvious modifications and equivalents will be apparent to one skilled in the art and the invention is therefore to be limited only by the scope of the appended claims.

We claim:

1. A process for the production of a 17β-acyloxyandrostane-3,6-dione from 6β-hydroxytestosterone by selective acylation of the 17β-hydroxy group with concomitant rearrangement of the Δ⁴-6β-hydroxy grouping to a 6-keto group, which comprises: reacting 6β-hydroxytestosterone with an organic carboxylic acid at a temperature between about fifteen and about eighty degrees centigrade to obtain a 17β-acyloxyandrostane-3,6-dione.

2. A process for the production of a 17β-acyloxyandrostane-3,6-dione from 6β-hydroxytestosterone by selective acylation of the 17β-hydroxy group with concomitant rearrangement of the Δ⁴-6β-hydroxy grouping to a 6-keto group, which comprises: reacting 6β-hydroxytestosterone with a weakly acidic organic carboxylic acid under essentially anhydrous conditions at a temperature between about fifteen and about eighty degrees centigrade in the presence of a strongly acidic catalyst to obtain a 17β-acyloxyandrostane-3,6-dione.

3. A process for the production of a 17β-acyloxyandrostane-3,6-dione from 6β-hydroxytestosterone by selective acylation of the 17β-hydroxy group with concomitant rearrangement of the Δ⁴-6β-hydroxy grouping to a 6-keto group, which comprises: reacting 6β-hydroxytestosterone with a weakly acidic organic carboxylic acid which is a liquid at the reaction temperature under essentially anhydrous conditions at a temperature between about fifteen and about eighty degrees centigrade in the presence of a mineral acid to obtain a 17β-acyloxyandrostane-3,6-dione.

4. A process for the production of 17β-acetoxyandrostane-3,6-dione from 6β-hydroxytestosterone by selective acylation of the 17β-hydroxy group with concomitant rearrangement of the Δ⁴-6β-hydroxy grouping to a 6-keto group, which comprises: reacting 6β-hydroxytestosterone with acetic acid under essentially anhydrous conditions at a temperature between about twenty and about thirty degrees centigrade in the presence of sulfuric acid to obtain 17β-acetoxyandrostane-3,6-dione.

5. A process for the production of 17β-propionyloxyandrostane-3,6-dione from 6β-hydroxytestosterone by selective acylation of the 17β-hydroxy group with concomitant rearrangement of the Δ⁴-6β-hydroxy grouping to a 6-keto group, which comprises: reacting 6β-hydroxytestosterone with propionic acid under essentially anhydrous conditions at a temperature between about twenty and about thirty degrees centigrade in the presence of sulfuric acid to obtain 17β-propionyloxyandrostane-3,6-dione.

6. A process for the production of 17β-(β-cyclopentylpropionyloxy)-androstane-3,6-dione from 6β - hydroxytestosterone by selective acylation of the 17β-hydroxy group with concomitant rearrangement of the Δ⁴-6β-hydroxy grouping to a 6-keto group, which comprises: reacting 6β-hydroxytestosterone with β-cyclopentylpropionic acid under essentially anhydrous conditions at a temperature between about twenty and about thirty degrees centigrade in the presence of sulfuric acid to obtain 17β-(β-cyclopentylpropionyloxy)-androstane-3,6-dione.

No references cited.